(12) United States Patent
Noel, II

(10) Patent No.: US 10,309,120 B1
(45) Date of Patent: Jun. 4, 2019

(54) PORTABLE ELEVATED PLATFORM ASSEMBLY FOR MOUNTING ON A PICKUP TRUCK

(71) Applicant: Phares Azarael Noel, II, Detroit, MI (US)

(72) Inventor: Phares Azarael Noel, II, Detroit, MI (US)

( * ) Notice: Subject to any disclaimer, the term of this patent is extended or adjusted under 35 U.S.C. 154(b) by 0 days.

(21) Appl. No.: 15/281,072

(22) Filed: Sep. 30, 2016

(51) Int. Cl.
  *E04H 15/08* (2006.01)
  *B62D 33/02* (2006.01)
  *E04G 27/00* (2006.01)

(52) U.S. Cl.
  CPC .............. *E04H 15/08* (2013.01); *B62D 33/02* (2013.01); *E04G 27/00* (2013.01)

(58) Field of Classification Search
  CPC .......... E04G 27/00; E04H 15/08; B62D 33/02
  See application file for complete search history.

(56) References Cited

U.S. PATENT DOCUMENTS

| | | | |
|---|---|---|---|
| 5,018,778 A | 5/1991 | Goble | |
| 5,215,346 A | 6/1993 | Reitzloff et al. | |
| 5,862,827 A | 1/1999 | Howze | |
| 6,435,584 B1 * | 8/2002 | Bonnville | B62D 24/00 280/781 |
| 8,453,795 B2 * | 6/2013 | Lee | A47C 12/00 182/33 |
| 8,678,472 B2 | 3/2014 | Pierce et al. | |
| 2002/0153201 A1 * | 10/2002 | Warford | E04F 11/025 182/115 |
| 2010/0294593 A1 * | 11/2010 | Gordon | E04F 11/02 182/115 |
| 2011/0024231 A1 * | 2/2011 | Wurth | E04G 3/24 182/113 |
| 2014/0262619 A1 * | 9/2014 | Bains | E04G 1/06 182/113 |

(Continued)

FOREIGN PATENT DOCUMENTS

WO    WO-2011109065 A2 *   9/2011   ............ B60L 11/126

*Primary Examiner* — Alvin C Chin-Shue
(74) *Attorney, Agent, or Firm* — Singh Law Firm, PLLC; Gautam B. Singh

(57) ABSTRACT

An elevated platform assembly suitable for mounting over the cargo area of a vehicle such as a pickup truck is disclosed. The platform assembly is modular for easy storage and can be conveniently transported to a scene wherever an elevated vantage point is desired, such as for viewing of outdoor musical concert, watching a game, or just camping out and observing nature. Embodiments of the invention disclosed include a normal platform, a wide platform for larger cargo areas where the platform is assembled with floor sections clamped together and supported with floor-pillars for extra support, or a long platform assembled with extendable platform floor modules fastened along the vehicle's axial or the length dimension. Also disclosed are the embodiments that include an awning assembly for providing shade to the occupants of the platform, and detachable handrails for the safety of platform occupants. Plurality of steps are included to facilitate the process of mounting the elevated level of the platform, particularly when occupants desire to place seating apparatus such as chairs or tables on the platform to enjoy the functionality offered by the invention.

16 Claims, 11 Drawing Sheets

(56) References Cited

U.S. PATENT DOCUMENTS

2015/0096837 A1\* 4/2015 Aguilar ............. E04F 15/02038
  182/115
2016/0251872 A1\* 9/2016 Tucker ................... E04H 15/08
  135/88.01

\* cited by examiner

PORTABLE ELEVATED PLATFORM ASSEMBLY FOR MOUNTING ON A PICKUP TRUCK

FIELD OF THE INVENTION

The present invention relates to an apparatus for assembling an elevated platform over the cargo area of a vehicle such as a pickup truck. The elevated platform assembly is collapsible for easy storage and transportation, is supported by the side panels of the vehicle and includes an awning for shade and guardrails for safety.

BACKGROUND OF THE INVENTION

The present invention is an elevated platform for mounting on the cargo area of a pickup truck, or a similar cargo vehicle. The platform apparatus is adapted to support seating by the way of placing some form of seating, for example, chairs on the flat platform floor created over the cargo area of the vehicle. The platform assembly is also collapsible for easy folding and transportation, and further includes a folding canopy or awning structure mounted over the platform for providing shade to the occupants seated on the elevated platform.

In the past, it has been common to provide pickup trucks with attachments for storage of goods in the cargo compartments, such as attachments for tool boxes included within the cargo space and attached to the sides of the cargo space; or dog boxes for placement inside the cargo areas; camping bodies including rigid covers and foldable canopy and tent structures for creating sleeping bunkers in the cargo area. Typical prior art does not include creating a seating platform on a pickup truck where the disclosed invention uses the side panels of the cargo area of a vehicle as the foundation to mount a solid floor thereupon allowing for placement of chairs and other seating apparatus atop the platform so that a viewing gallery is established for individuals engaged in watching a sport or a musical concert or the like.

The present invention relates generally to a collapsible elevated platform and more particularly to a collapsible structure forming a sturdy floor that includes telescoping legs for additional support of the platform floor. The frame is adapted for receiving an awning that provides shade for occupants seated on the elevated platform floor. Usage of steps for enabling easy access to the platform is also disclosed. When additional safety is needed for occupants, such as children, handrails are attached around the perimeter for safety of the occupants.

While a number of space-adding devices are disclosed in the prior art, these devices include components that are typically designed to adapt or use the cargo area as a specialized storage or some sort. As such, these devices teach away from adapting the cargo area to create a foundation for mounting another structure such as an elevated viewing platform disclosed in this application.

SUMMARY OF THE INVENTION

The present invention is a collapsible platform designed for mounting on a cargo vehicle. The invention broadly comprises of an elevated platform, a tent awning frame, adapted for use with a vehicle having open side panels for providing support.

There are many technical problems associated with attaching an elevated platform over the cargo area of a cargo vehicle, such as a pick-up truck. These technical problems are generally related to the extent and the size of the platform that would be very large and make it difficult for transportation. Moreover, there are issues of the elevated platform sagging when such as structure is subjected to loading by the occupants of the platform.

The invention disclosed overcomes these technical problems by sectioning the platform both along the longitudinal and axial dimensions. Embodiments of the invention also include telescoping legs for further supporting of platform floor. Additional stability features, such as stakes adapted to fit into the side panel pockets, and collars to prevent lateral movement of the platform, are included as part of the platform. Safety features such as guard rails and steps allow the disclosed invention to be used safely for families' enjoyment. Attachments like the awning for providing shade make the viewing experience comfortable for occupants of the platform.

In addition to the advantages offered by the elevated platform for stable, safe, and comfortable accessible through a plurality of steps, the platform is created using collapsible parts that facilitate transportation and ease of storage. Interlocking of panel sections not only make the platform floor modules smaller and amenable for easy transportation, the attached legs rest on the cargo bed provide support and prevent sagging. Platform floor design with sections of extensible panels further makes it adaptable for accommodating a larger number of occupants, or for setting up on larger cargo vehicles.

Other features and advantages are inherent in the structure claimed and disclosed or will become apparent to those skilled in the art from the following detailed description in conjunction with the accompanying diagrammatic drawings.

BRIEF DESCRIPTION OF THE DRAWINGS

FIG. 3A depicts a schematic of the flush mounted draw clamps in a closed conformation, while

DRAWINGS—REFERENCE NUMERALS

Platform Support Pole 30
Platform Support Foldable Leg 32
Platform Steps 34
Cargo Steps 36
Full Width Platform Floor 38
Full Width Platform Sections 39
Platform Section 40
Section Interlock Tooth 41
Section Clamps 42
Section Interlock Receptor 43
Retaining Collar 44
Retaining Pin 46
Mounting Stake 48
Mounting Half Stake 49
Stake Pocket 50
Section Overhang 52
Inside Block 54
Telescopic Legs 56
Platform Legs 57
Leg Receptacles 58
Awning Pole 60
Awning Flexible Hinge 62
Awning Shade 64
Guard Rails 66
Platform Floor 70
Elevated Platform Assembly 75

DETAILED DESCRIPTION OF THE INVENTION

Figure 1:
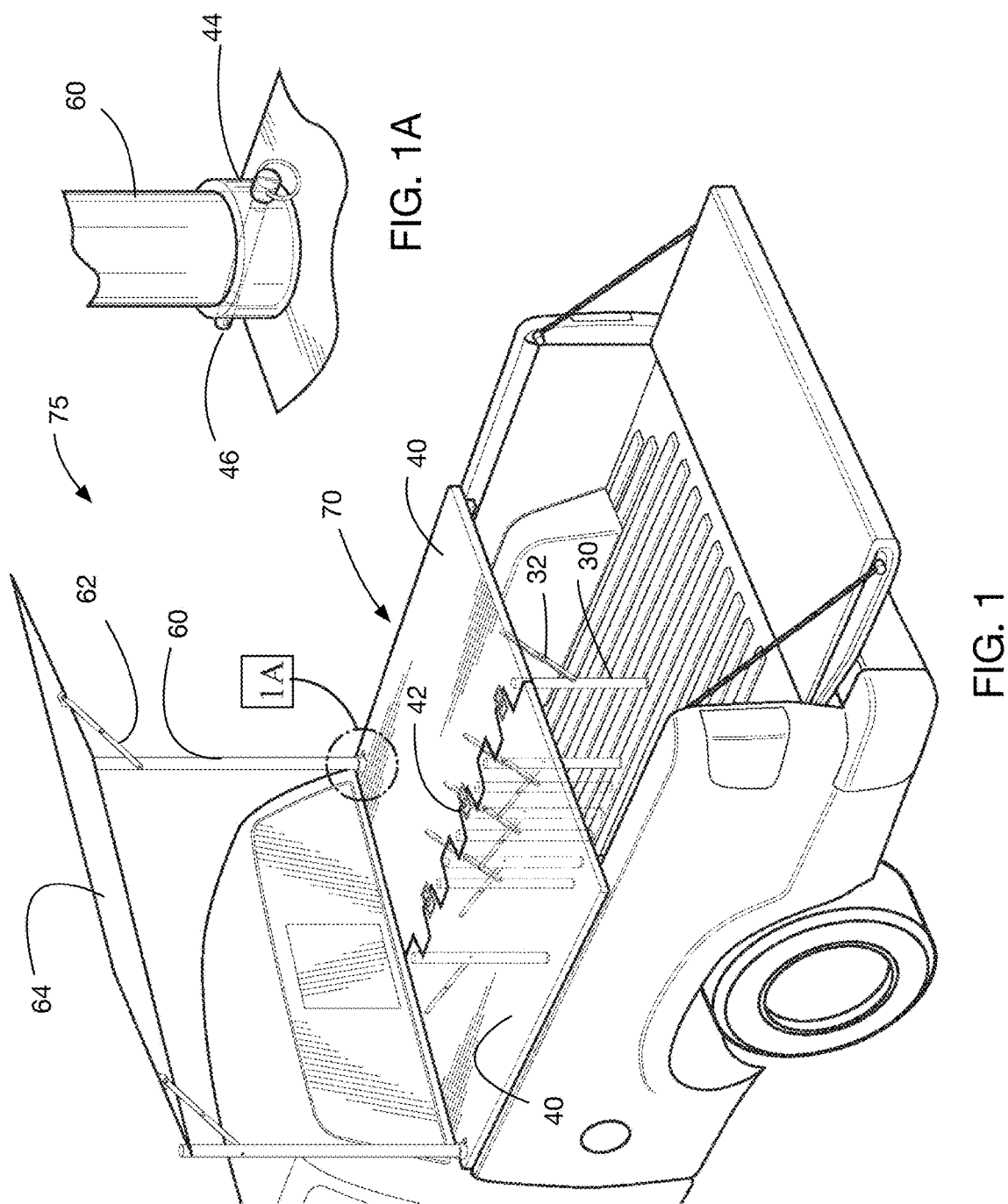
FIG. 1 is a view of the elevated platform installed over the cargo area of a pickup truck with FIG. 1A showing the detailed view of a fastener used for attaching a mounting pole to the elevated platform.

FIG. 1 is a perspective view of an embodiment of the invention. The embodiment includes two Platform Sections 40 adapted to engage each other to create an Elevated Platform Assembly 75 supported by a plurality of Platform Support Poles 30. The Elevated Platform Assembly 75 is formed by interlocking a plurality of Platform Sections 40 wherein the individual sections are secured with a plurality of Section Clamps 42. Each of the plurality of interlocked Platform Sections 40 is supported by a Platform Support Pole 30 on one end and the sidewall or side-panel of a cargo vehicle, such as a pickup truck, on the other end. The platform assembly formed by the interlocking Platform Sections 40 pieces also includes a plurality of Awning Poles 60 attached to the platform on the one end and supporting an Awning Shade 64 attached through Awning Flexible Hinge 62 whereby the Awning Shade 64 may be folded and flattened over the Awning Poles 60 which are detached from the platform base for easy storage and transportation.

An embodiment of the invention uses a plurality of interlocking panels. While not limiting the types of interlocking mechanism that may be used for this purpose, an elevated platform assembly embodiment comprises of a platform floor further comprises (a) a left platform floor section where the left platform floor section is approximately rectangular in shape and has a left edge, a right edge, a front edge, and a rear edge where each of the left edge, the right edge, the front edge and the rear edge has a length dimension, and the length dimension of the left edge and length dimension of the right edge are approximately equal, and the length dimension of the front edge and the length dimension of the rear edge are approximately equal, and the right edge includes a plurality of interlock teeth and a plurality of interlock receptors laid out along the length of the right edge in an alternating arrangement where each of the plurality of interlock teeth is followed by an interlock receptor and each of the plurality of interlock receptor is followed by an interlock tooth; an upper surface and a lower surface wherein the lower surface includes a plurality of stakes fixedly attached along the left edge with the plurality of stakes adapted to communicate into plurality of preexisting pockets included within the side panels of a cargo vehicle, and a plurality of platform support poles with each of the plurality of platform support poles having a length, a first end and a second end with the first end attached along the right edge with a hinge capable of being engaged in a fixed position, and the length of the platform support pole adapted to have the second end in contact with floor of the cargo vehicle when the hinge is engaged in a fixed position; (b) a right platform floor section where the right platform floor section is approximately rectangular in shape and has a left edge, a right edge, a front edge, and a rear edge where each of the left edge, the right edge, the front edge and the rear edge has a length dimension, and the length dimension of the left edge and length dimension of the right edge are approximately equal, and the length dimension of the front edge and the length dimension of the rear edge are approximately equal, and the left edge includes a plurality of interlock teeth and a plurality of interlock receptors laid out along the length of the right edge in an alternating arrangement where each of the plurality of interlock teeth is followed by a interlock receptor and each of the plurality of interlock receptor is followed by an interlock tooth; an upper surface and a lower surface wherein the lower surface includes a plurality of stakes fixedly attached along the right edge with the plurality of stakes adapted to communicate into a plurality of preexisting pockets included within the side panels of a cargo vehicle, and a plurality of platform support poles with each of the plurality of platform support poles having a length, a first end and a second end with the first end attached along the left edge with a hinge capable of being engaged in a fixed position, and the length of the platform support pole adapted to have the second end in contact with a floor of the cargo vehicle when the hinge is engaged in a fixed position; where the interlock receptors on the right edge of the left platform floor section are adapted to receive the interlock teeth on the left edge of the right platform floor section, and the interlock receptors on the left edge of the right platform floor section are adapted to receive the interlock teeth on the right edge of the left platform floor section, such that upon communicating the interlock teeth and receptors on the left platform section and the right platform section, a substantially uniform platform floor is formed with the upper surface of the left platform section aligned with the upper surface of the right platform section with no substantial discontinuity.

An embodiment of the elevated platform assembly further includes a left lip fixedly attached to the lower surface along the front edge of the left platform floor section and a right lip fixedly attached to the lower surface of the front edge of the right platform floor section, where the left lip and the right lip are adapted to communicate into a preexisting cavity between a driver section and a cargo section of the cargo vehicle.

FIG. 1A illustrates an embodiment of the invention wherein the Awning Pole 60 is secured to the Platform Sections 40 with a collar-pin fastener. An embodiment of the invention includes a Retaining Collar 44 fixedly attached to a Platform Section 40 adapted to support a mounting of an Awning Pole 60 therein. The end of the Awning Pole 60 inserted into the Retaining Collar 44 and both further include a hole coinciding with the diameter of the pole wherein a Retaining Pin 46 inserted there through and through the hole in the Retaining Collar 44 and the hole in the Awning Pole 60 is adapted to securely lock the Awning Pole 60 in an upright and mounted position.

An embodiment of the elevated platform assembly further comprises of an awning having a left pole, a right pole, and a substantially rectangular shade component having an edge with a first end and a second end, with the left pole and the right pole hingeably connected respectively to the first end and the second end of the edge of the shade component, a left collar where the left collar is fixedly attached to a left collar location on the upper surface of the left platform floor section, a right collar where the right collar is fixedly attached to a right collar location on the upper surface of the right platform floor section, the left collar is adapted to receive the left pole, and the right collar is adapted to receive the right pole, and the left collar location and the right collar location are adapted to position the awning shade vertically above the upper surface of the platform floor upon inserting the left pole into the left collar and inserting the right pole into the right collar.

An embodiment of the elevated platform assembly further includes a handrail where the handrail is detachably attached to the upper surface along the left edge of the left platform section, the upper surface along the rear edge of both the left and the right platform floor sections, and the upper surface along the right edge of the right platform floor section. An embodiment of the elevated platform assembly further has a platform floor with a width larger than the width of the vehicle's cargo area with the platform floor, having an outside portion of the platform floor where the outside portion overhangs the vehicle's cargo area, and further having a plurality of telescopic legs with an adjustable height wherein the telescopic legs are in communication between the lower surface of the outside portion of the platform floor and a ground upon which the cargo vehicle is parked. An embodiment of the elevated platform assembly further includes a plurality of stepping devices having a step size lower than height of the cargo vehicle floor.

Figure 2:
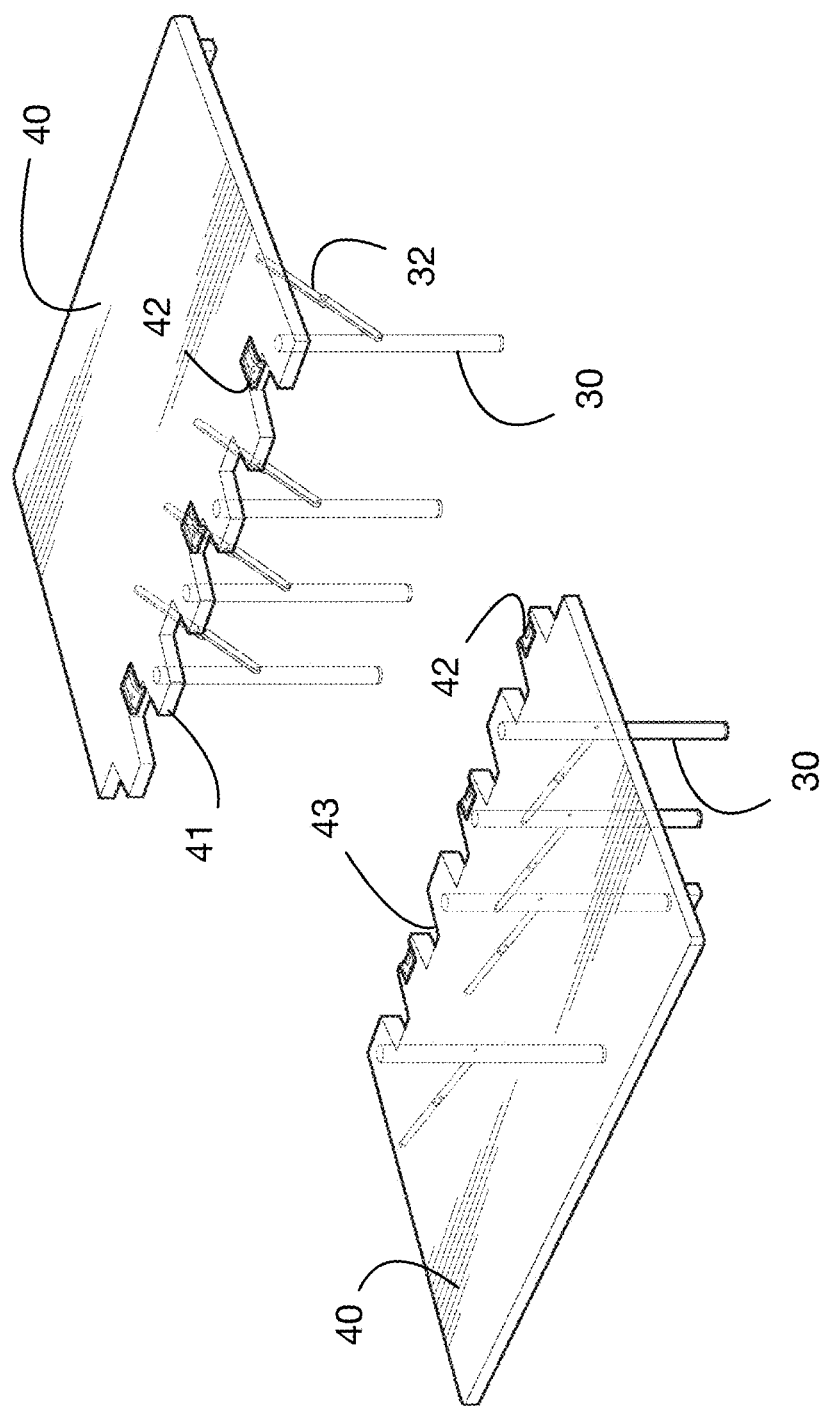
FIG. 2 illustrates the interlocking mechanism for forming a complete platform using complementary sections that are fastened and supported with pillars for added stability.

FIG. 2 is a view of the Elevated Platform Assembly 75 interlocking a plurality of Platform Sections 40 wherein the individual sections are secured with a plurality of Section Clamps 42. In the embodiment of the invention shown the Platform Sections 40 are formed by interlocking of the Section Interlock Receptor 43 and Section Interlock Tooth 41 which are complementary shaped surface elements such that when the two align with each other, and Section Interlock Tooth 41 is inserted into the Section Interlock Receptor 43, what results is a planar surface with no gaps. The Section Interlock Tooth 41 is supported by a Platform Support Pole 30 attached to Platform Support Foldable Leg 32 designed have the Platform Support Pole 30 fold into the plane of the Platform Sections 40 when the Elevated Platform Assembly 75 is not in use. The Platform Sections 40 interlock with each other and are secured with a plurality of Section Clamps 42 with the clamps to be in plane and flush mounted with the surface of the Platform Sections 40 when engaged so as to create a uniform planar surface without any protrusions or undulations on the surface of the floor of the Elevated Platform Assembly 75. The Platform Sections 40 also include a Mounting Stake 48 adapted to be inserted into a Stake Pocket 50 included in the side-panels of the cargo areas of a vehicle or a pickup truck.

A construction of the Elevated Platform Assembly 75 floor by interlocking complementary sections as illustrated in FIG. 2 renders an ease of storage and transportation of the invention. Furthermore, in an embodiment of the invention the plurality of the Platform Sections 40 utilized are such that either one may be used in place of the other. That is, in an embodiment of the invention, the Platform Sections 40 that do not use a overhand may be used rotationally symmetrically so that the left section may be interchangeably used as the right section and vice versa. In an embodiment of the invention the Platform Sections 40 are made with hardened plastic, or wood, or other similar material.

Figure 3B:
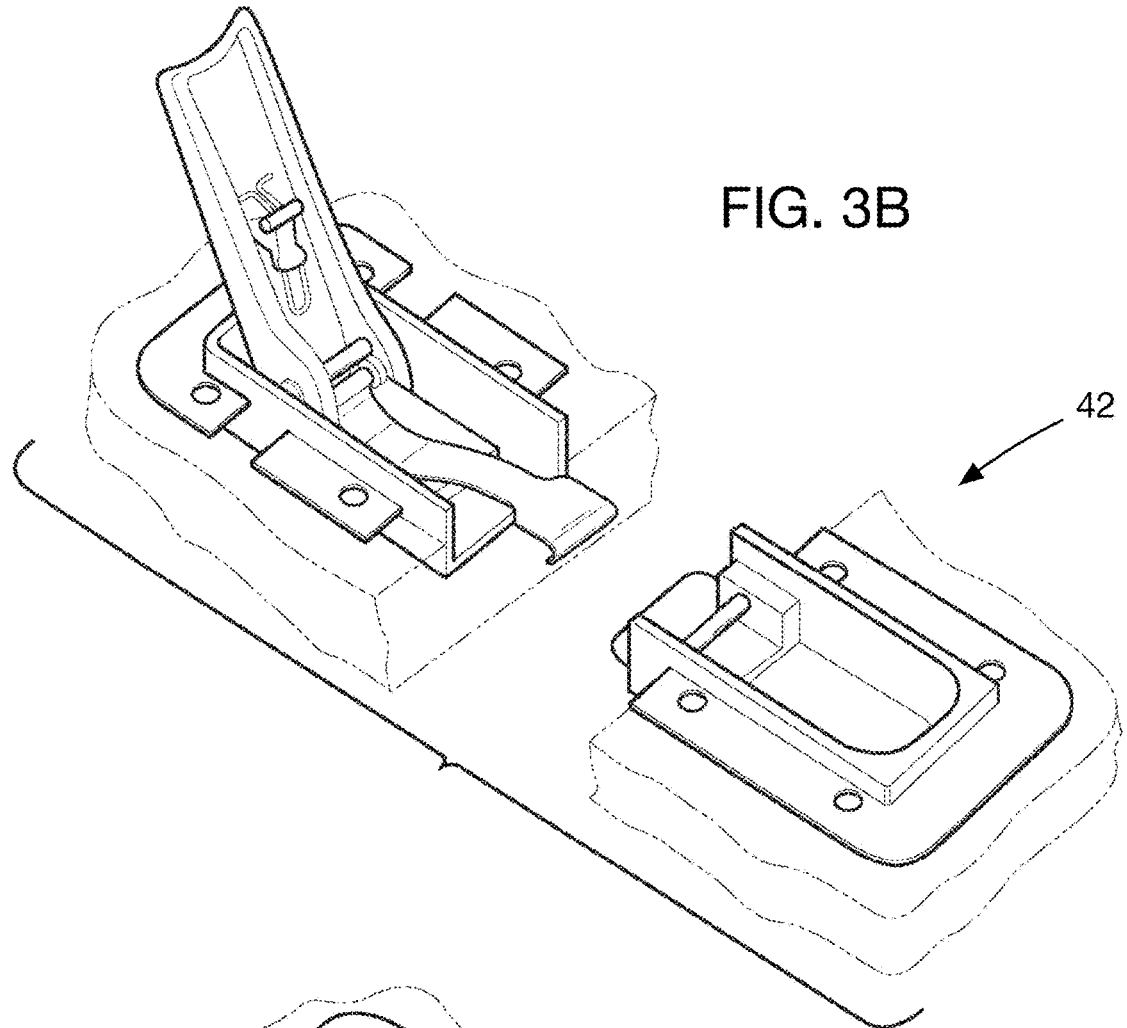
FIG. 3B depicts the clamp in an open conformation.
Figure 3A:
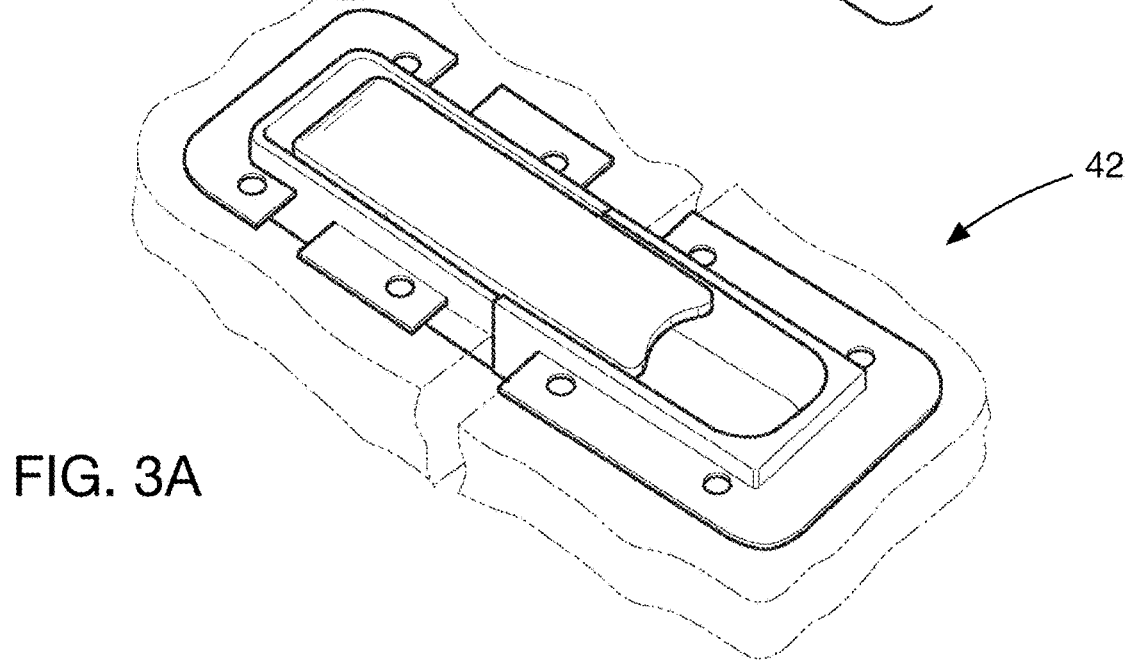

Illustrated in FIG. 3 is a type of draw clamps used for fastening interlocking Platform Sections 40 so as to create a stable floor for the Elevated Platform Assembly 75. FIG. 3 shows the conformation of the draw clamps when they are fully engaged and thus conform to the surface of Platform Sections 40. FIG. 3A illustrates the conformation of the clamps where they have been disengaged to allow the disassembly of the platform floor for easy storage of the Platform Sections 40.

Figure 4:
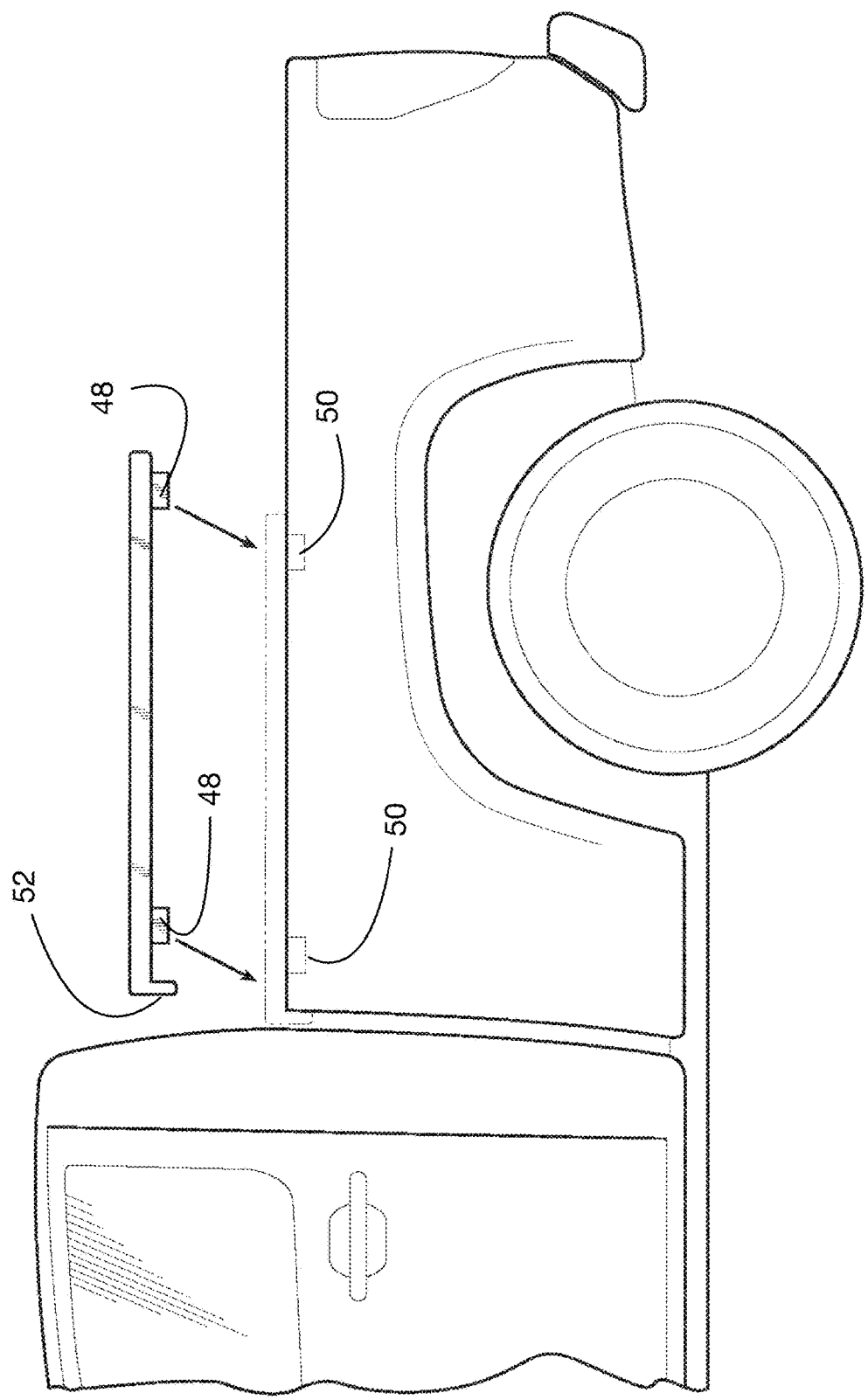
FIG. 4 depicts the use of stakes fixedly attached to the bottom surface of the platform that are inserted into the pockets in the side panel for added stability.

Illustrated in FIG. 4 is an orthographic view of the floor of the Elevated Platform Assembly 75. The use of Mounting Stake 48 inserted into the Stake Pocket 50 is shown whereby the platform floor is rendered stable and secure enough for occupants to be seated thereupon. The Stake Pocket 50 is generally a feature of most cargo vehicles for supporting the insertion of standard attachments such as cargo area covers available as standard accessories for pickup trucks. In the present invention, the Stake Pocket 50 is utilized for inserting Mounting Stake 48 to maintain the floor of Elevated Platform Assembly 75 in a stable conformation suitable for accommodating a plurality of occupants with adequate level of safety. Also illustrated in the embodiment depicted is the use of Section Overhang 52, which is inserted in the cavity between the cab and the cargo area to further reduce any unintended movement of the platform.

Figure 5:
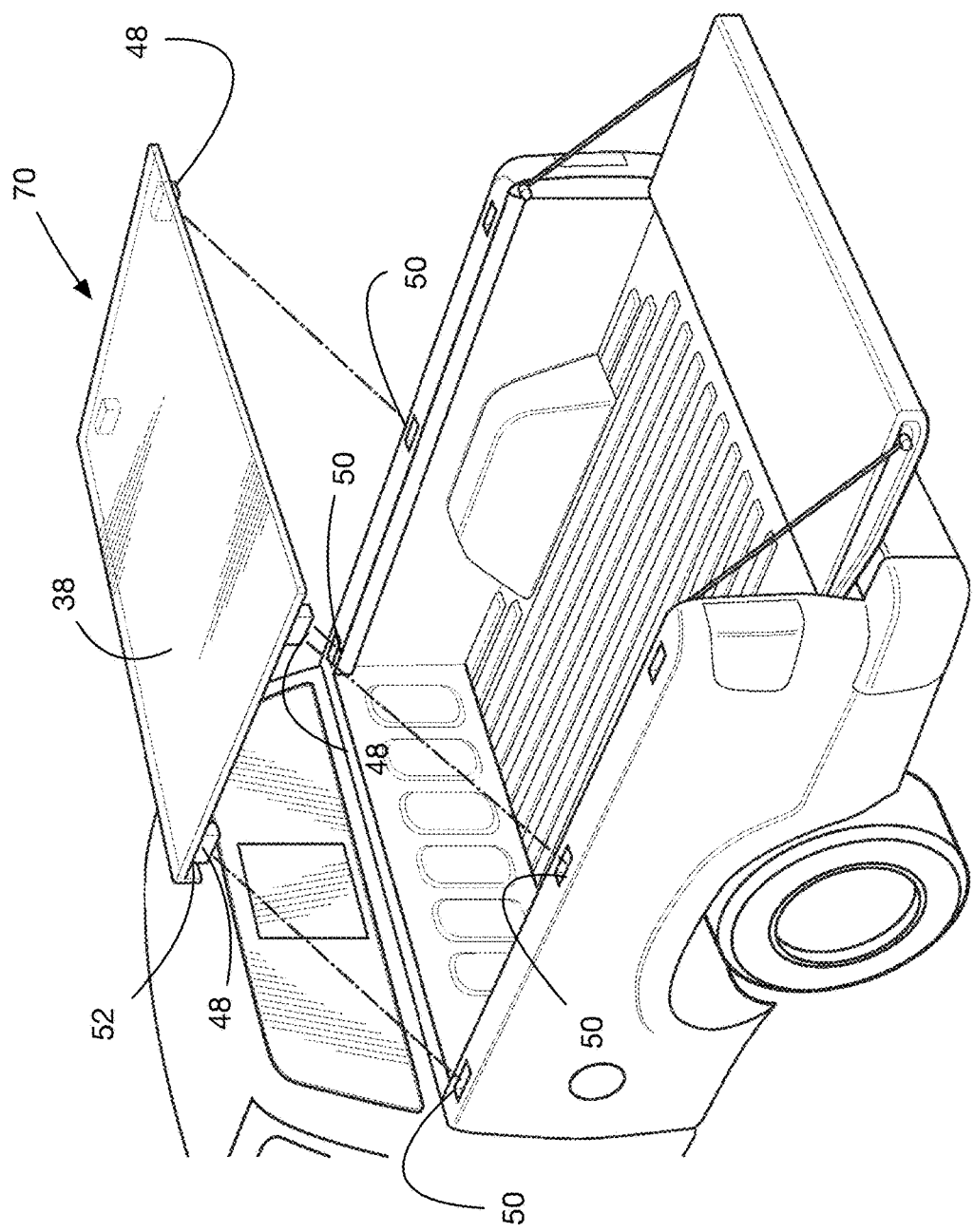
FIG. 5 illustrates a monolithic (i.e. without platform section) elevated platform floor that is mounted over the cargo area attached over the cargo area by inserting the stakes into the pockets with the overhang preventing any longitudinal movements.

FIG. 5 depicts a perspective view of an embodiment of the Elevated Platform Assembly 75 wherein the platform floor is constructed with a single Full Width Platform Floor 38 rather than multiple sections that are interlocked, fastened and supported together to create the full width and extent of the floor. Since the single Full Width Platform Floor 38 will have to support the weight of platform occupants, the material used for construction of the Full Width Platform Floor 38 will need to be that with high tensile strength and load bearing capabilities including metals such as hardened lightweight-steel or aluminum alloys, or fiberglass, or other appropriate materials. The embodiment includes Mounting Stake 48 inserted into Stake Pocket 50 as well as a Section Overhang 52 lip that fits into the space between the cab and cargo areas of a pickup truck. The purpose of including Mounting Stake 48 is to prevent lateral or sideways movements, and the purpose of Section Overhang 52 is to prevent axial or forward and backward movements of the platform floor. When the Mounting Stake 48 and Section Overhang 52 are engaged the platform floor is in a very snug and stable conformation necessary and suitable for the safety of the occupants seated or otherwise situated thereupon.

An embodiment of the elevated platform assembly comprising a platform floor with an approximately rectangular shape having a left edge, a right edge, a front edge, and a rear edge where each of the left edge, the right edge, the front edge and the rear edge, and the length dimension of the left edge and length dimension of the right edge is approximately equal, and the length dimension of the front edge and the length dimension of the rear edge is approximately equal; a lower surface wherein the lower surface includes a plurality of stakes along the left edge with each of the plurality of left edge stakes being fixedly attached to the lower surface and adapted to communicate into a plurality of preexisting pockets included on a top surface of a left side panels of a cargo vehicle, a plurality of stakes along the right edge with each of the plurality of right edge stakes being fixedly attached to the lower surface and adapted to communicate into a plurality of preexisting pockets included on a top surface of right side panels of the cargo vehicle; an upper surface adapted to receive occupants thereupon. An embodiment of the elevated platform assembly further includes a lip fixedly attached to the lower surface along the front edge of the platform floor, where the lip is adapted to communicate into a preexisting cavity between a driver section and a cargo section of the cargo vehicle.

An embodiment of the elevated platform assembly further includes an awning having a left pole, a right pole, and a substantially rectangular shade component having an edge with a first end and a second end, with the left pole and the right pole hingeably connected respectively to the first end and the second end of the edge of the shade component, a left collar where the left collar is fixedly attached to a left collar location on the upper surface of the platform floor, a right collar where the right collar is fixedly attached to a right collar location on the upper surface of the platform floor, the left collar is adapted to receive the left pole, and the right collar is adapted to receive the right pole, and the left collar location and the right collar location are adapted to position the awning shade vertically above the upper surface of the platform floor upon inserting the left pole into the left collar and inserting the right pole into the right collar.

An embodiment of the elevated platform assembly further includes a handrail where the handrail is detachably attached to the upper surface along the left edge, the upper surface along the rear edge, and the upper surface along the right edge. An embodiment of the elevated platform assembly further includes a platform floor with a width larger than the width of the vehicle's cargo area with the platform floor having an outside portion of the platform floor where the outside portion overhangs the vehicle's cargo area, and further having a plurality of telescopic legs with an adjustable height wherein the telescopic legs are in communication between the lower surface of the outside portion of the platform floor and a ground upon which the cargo vehicle is parked. An embodiment of the elevated platform assembly further includes a plurality of stepping devices having a step size lower than a height of the cargo vehicle floor.

Figure 6:
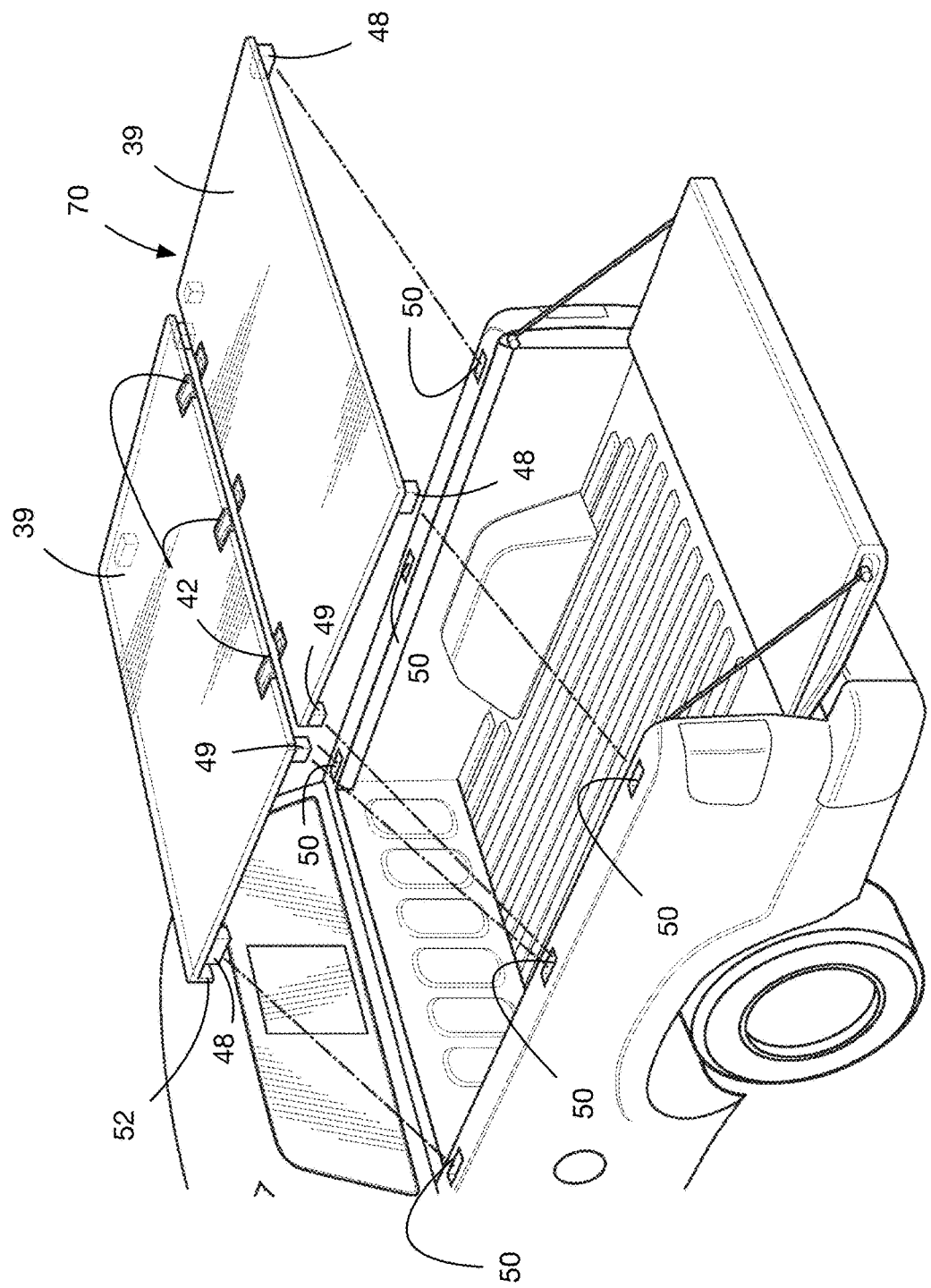
FIG. 6 illustrates a configuration of the platform floor comprising of multiple pieces placed back to back to create a longer platform.

FIG. 6 illustrates the use of multiple full-width sections that are axially attached to create a longer platform. In an embodiment of the invention shown multiple Full Width Platform Sections 39 are attached back to back with a plurality of Section Clamps 42 that enable a longer platform floor for Elevated Platform Assembly 75. The individual Full Width Platform Sections 39 are designed such that a Mounting Half Stake 49 is utilized to insert the two adjacent Full Width Platform Sections 39 into a single Stake Pocket 50. The front most Full Width Platform Sections 39 incorporates a Section Overhang 52 to insert into the cavity between the cab and the cargo area. The full size Mounting Stake 48 are inserted individually into Stake Pocket 50 at the front and rear end of the platform.

An embodiment of the elevated platform assembly comprising—(a) a main platform floor module with an approximately rectangular shape having a left edge, a right edge, a front edge, and a rear edge where each of the left edge, the right edge, the front edge and the rear edge, and the length dimension of the left edge and length dimension of the right edge is approximately equal, and the length dimension of the front edge and the length dimension of the rear edge is approximately equal, a lower surface wherein the lower surface includes a plurality of stakes along the left edge with each of the plurality of left edge stakes being fixedly attached to the lower surface and adapted to communicate into a plurality of preexisting pockets included on a top surface of a left side panels of a cargo vehicle, a plurality of stakes along the right edge with each of the plurality of right edge stakes being fixedly attached to the lower surface and adapted to communicate into a plurality of preexisting pockets included on a top surface of right side panels of the cargo vehicle, an upper surface adapted to receive occupants thereupon; (b) an extender platform floor module having approximately rectangular shape having a left edge, a right edge, a front edge, and a rear edge where each of the left edge, the right edge, the front edge and the rear edge, and the length dimension of the left edge and length dimension of the right edge is approximately equal, and the length dimension of the front edge and the length dimension of the rear edge is approximately equal, a lower surface wherein the lower surface includes a plurality of stakes along the left edge with each of the plurality of left edge stakes being fixedly attached to the lower surface and adapted to communicate into a plurality of preexisting pockets included on a top surface of left side panels of a cargo vehicle, a plurality of stakes along the right edge with each of the plurality of right edge stakes being fixedly attached to the lower surface and adapted to communicate into a plurality of preexisting pockets included on a top surface of a right side panels of the cargo vehicle, an upper surface adapted to receive occupants thereupon; having the last stake on the main platform floor module occupy the same pocket as the first stake of the extender module.

An embodiment of the elevated platform assembly further including a lip fixedly attached to the lower surface along the front edge of the main platform floor module where the lip is adapted to communicate into a preexisting cavity between a driver section and a cargo section of the cargo vehicle. An embodiment of the elevated platform assembly further including an awning having a left pole, a right pole, and a substantially rectangular shade component having an edge with a first end and a second end, with the left pole and the right pole hingeably connected respectively to the first end and the second end of the edge of the shade component, a left collar where the left collar is fixedly attached to a left collar location on the upper surface of the main platform floor module, a right collar where the right collar is fixedly attached to a right collar location on the upper surface of the main platform floor module, the left collar is adapted to receive the left pole, and the right collar is adapted to receive the right pole, and the left collar location and the right collar location are adapted to position the awning shade vertically above the upper surface of the main platform floor module upon inserting the left pole into the left collar and inserting the right pole into the right collar.

An embodiment of the elevated platform assembly further including a handrail where the handrail is detachably attached to the upper surface along the left edge of the extender platform floor module, upper surface along the left edge of the main platform floor module, the upper surface along the rear edge of the main platform floor module, the upper surface along the right edge of the main platform floor module, and the upper surface along the right edge of the extender platform floor module.

An embodiment of the elevated platform assembly further including the main platform floor module and the extender platform floor module having a width larger than the width of the vehicle's cargo area with the main platform floor module having an outside portion of the platform floor and the outside portion of the extender platform floor module where the outside portion of the main platform floor module and the outside portion of the extender platform floor module overhangs the vehicle's cargo area, and further having a plurality of telescopic legs with an adjustable height wherein the telescopic legs are in communication between the lower surface of the outside portion of the main platform floor module and the outside portion of the extender platform floor module and a ground upon which the cargo vehicle is parked. An embodiment of the elevated platform assembly further including a plurality of stepping devices having a step size lower than a height of the cargo vehicle floor.

Figure 7:
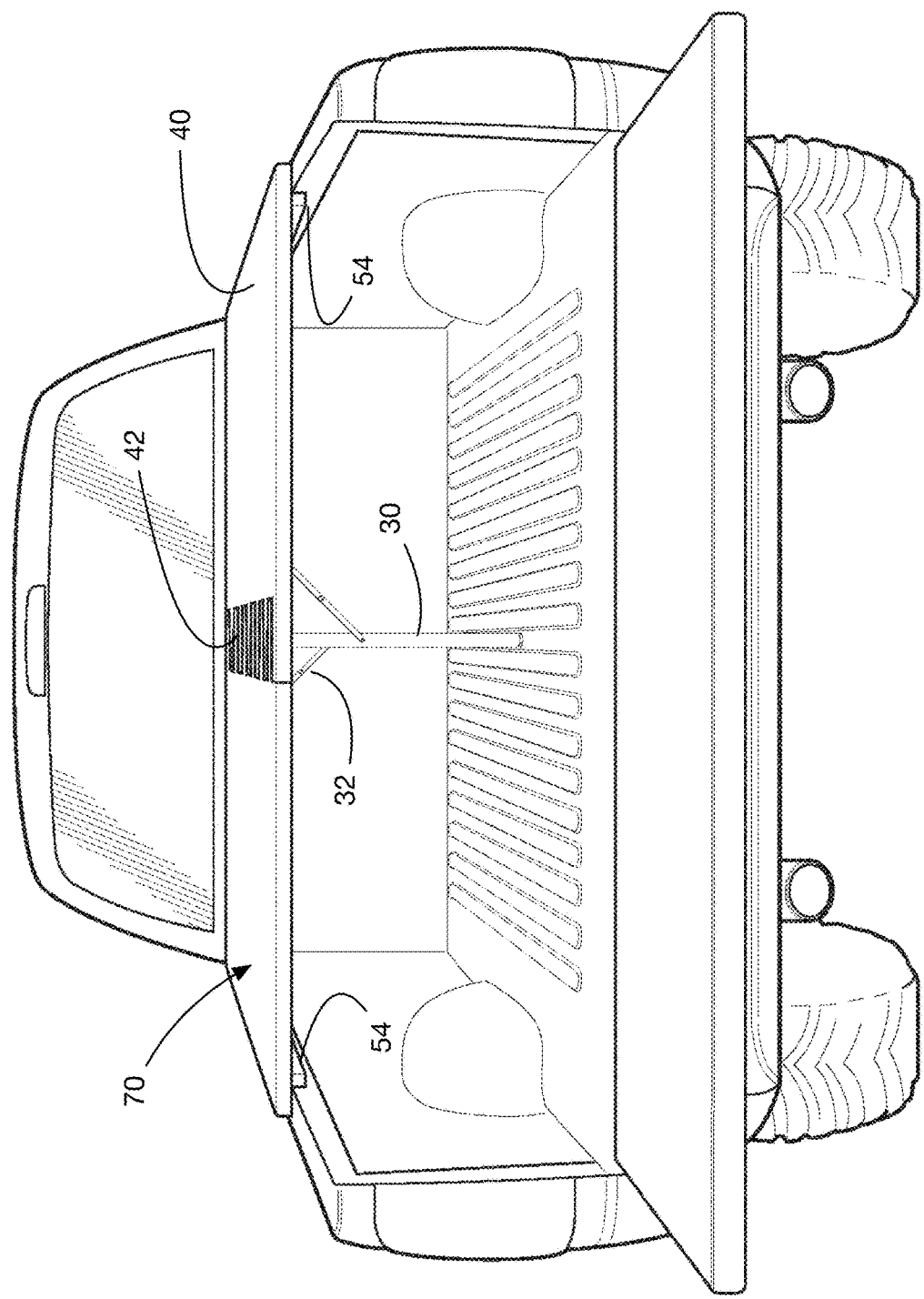
FIG. 7 depicts the use of an inside block 54 that prevents lateral movements and results in added stability of the platform floor.

Illustrated next in FIG. 7 is the rear perspective view of the platform floor depicting the use of the Inside Block 54 which is designed to prevent the lateral movements of the platform floor. In an embodiment of the invention, the Inside Block 54 is another mechanism for achieving the objective of inserting Section Overhang 52 into the cavity between cab and cargo area, and Mounting Stake 48 into Stake Pocket 50. The Inside Block 54 runs across the entire axial length of the platform and is fixedly attached to the lower surface of the platform floor. The pair of Inside Block 54, one on each axial edge along to the platform floor complement each other and prevent any lateral slippage of the platform floor. An embodiment of the invention includes both the use of Inside Block 54 as well as the Mounting Stake 48 and Stake Pocket 50; or Mounting Stake 48, Mounting Half Stake 49, and Stake Pocket 50.

Figure 8:
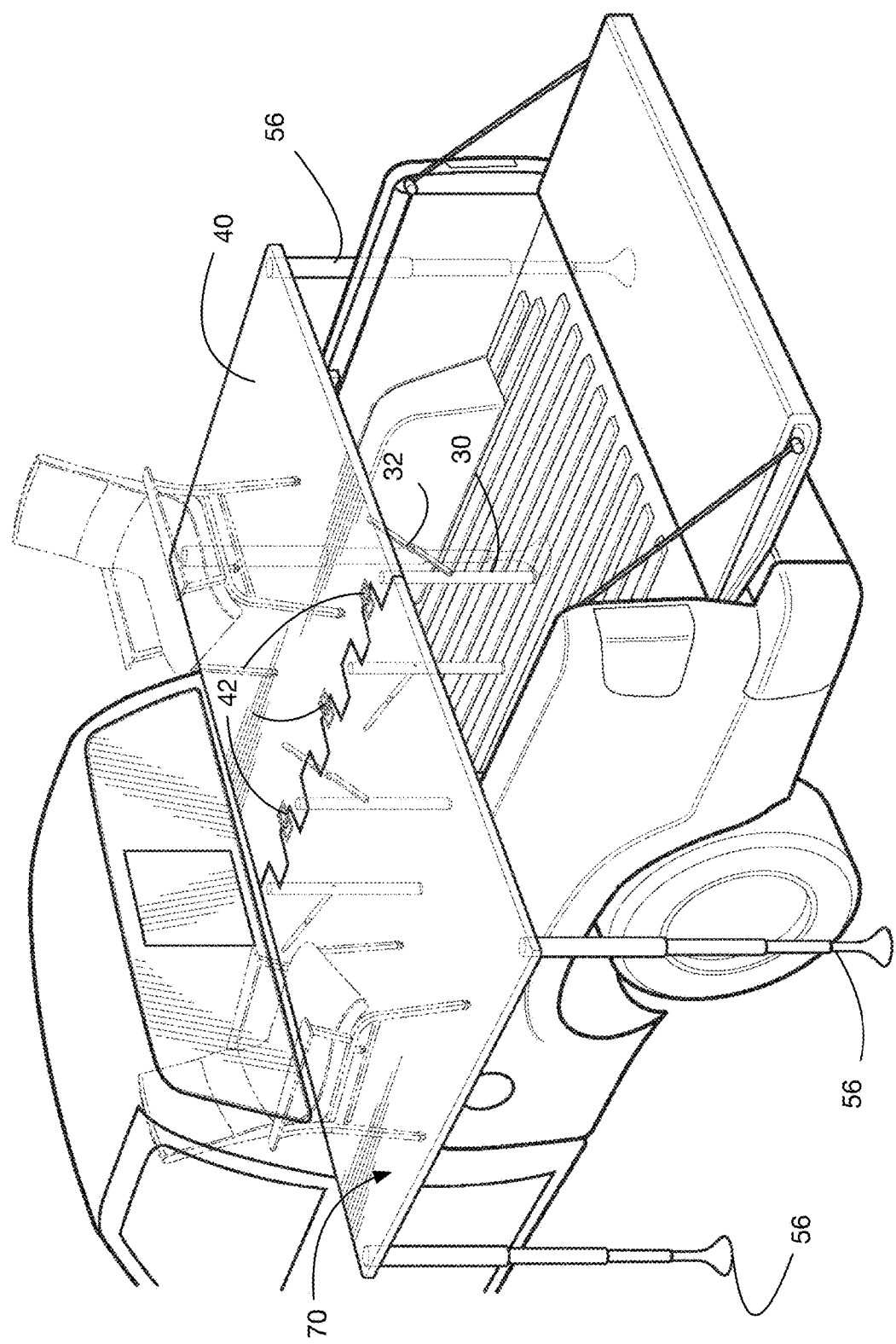
FIG. 8 shows an embodiment of the invention that uses telescopic legs for supporting a larger platform extending beyond the side walls of the cargo area.

FIG. 8 depicts an embodiment of the Elevated Platform Assembly 75 wherein the width of the Platform Floor 70 is wider and stretches over the side panel of the cargo area of the pickup truck. The Platform Floor 70 is constructed with Platform Sections 40, that are fastened with a plurality of Section Clamps 42 and supported by a plurality of Platform Support Poles 30. The edges of the Platform Floor 70 that extend beyond the lateral width of the cargo area are supported by a plurality of Telescopic Legs 56. In the embodiment of the invention shown the Telescopic Legs 56 are designed to adjust to the height of vehicle and thereby support the platform. While the illustration of the embodiment shown uses four Telescopic Legs 56, this is not a limitation and additional Telescopic Legs 56 may be added for additional support. The Telescopic Legs 56 are extended to the needed height and located under the platform where additional support is needed. The Telescopic Legs 56 have a rotatable height adjustment mechanism whereby the height is increased after the leg is placed under Platform Floor 70 until a desired snugness is achieved.

Figure 9:
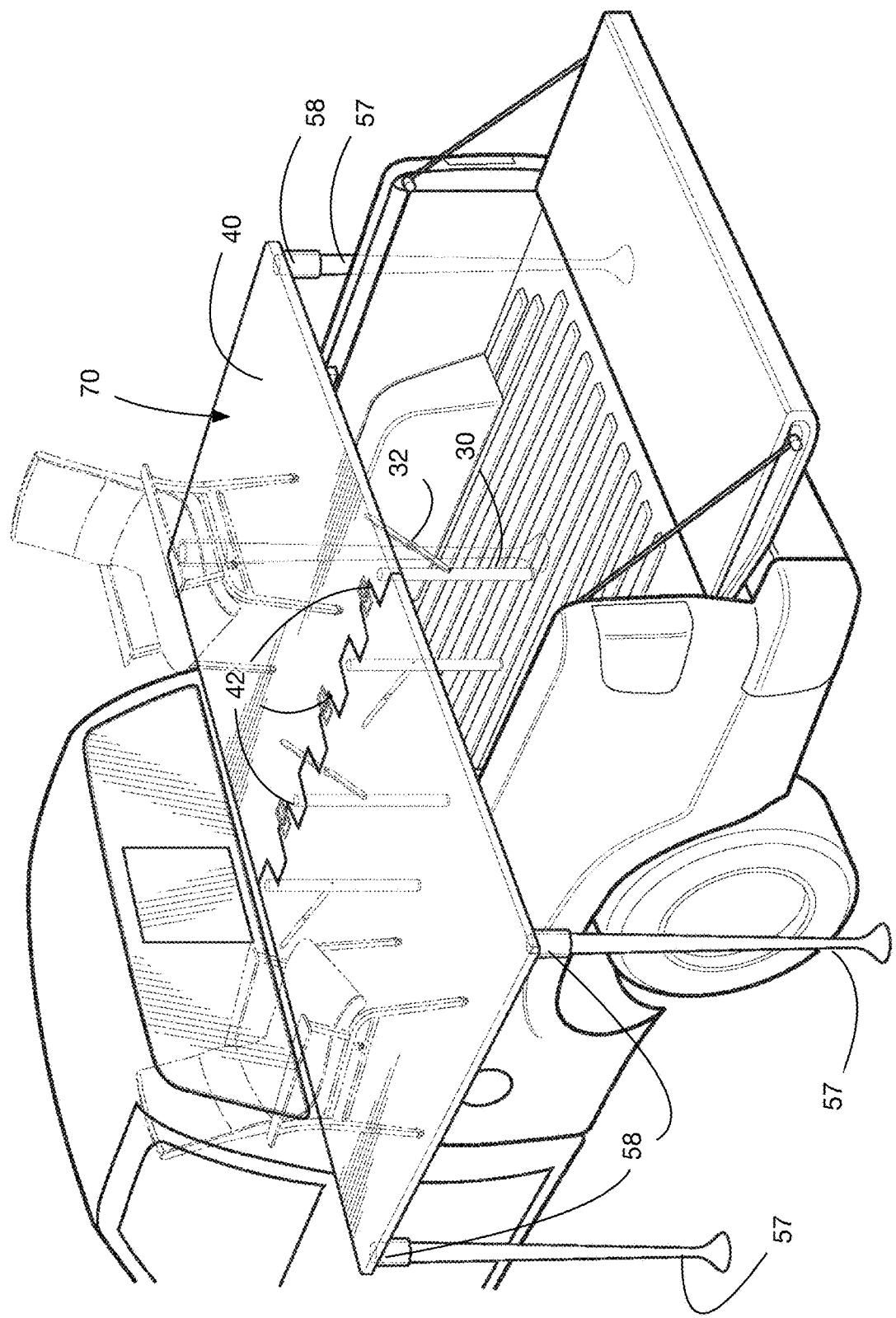
FIG. 9 shows an embodiment of the invention that uses non-telescopic legs for supporting a larger platform extending beyond the side walls of the cargo area.

FIG. 9 illustrates an embodiment of Elevated Platform Assembly 75 where the support legs for the wider Platform Floor 70 are supported by a plurality of non-telescopic Platform Legs 57 that are removably attached to the base of the Platform Floor 70. The base of the Platform Floor 70 includes a plurality of Leg Receptacles 58 that are fixedly attached to the based of the Platform Floor 70. The Platform Legs 57 are inserted into the Leg Receptacles 58 to provide additional stability and load bearing capability to the Platform Floor 70.

Figure 10:
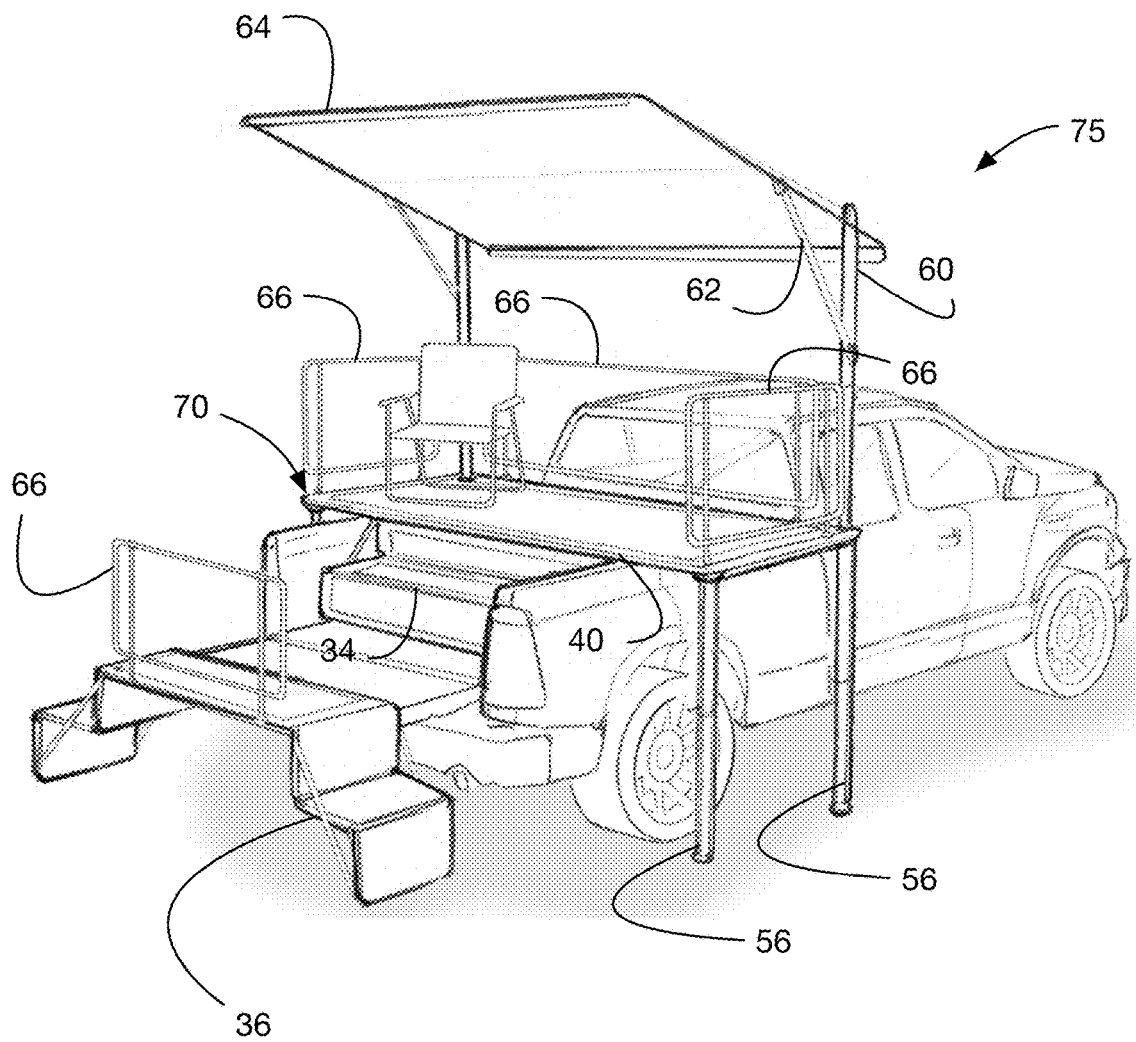
FIG. 10 is a perspective view of the invention including the use of steps and guardrails for added safety and utility.

FIG. 10 illustrates an environmental view of the Elevated Platform Assembly 75. In the embodiment of the invention, a set of Guard Rails 66 is utilized for the safety of the occupants of Platform Floor 70. The Guard Rails 66 are removably attached to Platform Floor 70. The embodiment utilizes foldable Cargo Steps 36 to assist in climbing on to the cargo area of cargo vehicle or pickup truck. Guard Rails 66 are also removably attached to the Cargo Steps 36 for the safety of platform users as they climb up to the cargo floor before reaching the elevated Platform Floor 70. Another Platform Steps 34 further assists the platform user in climbing up from the cargo floor to the elevated Platform Floor 70. In the embodiment of the invention shown, the Platform Floor 70 comprises of a single Platform Section 40.

Figure 11:
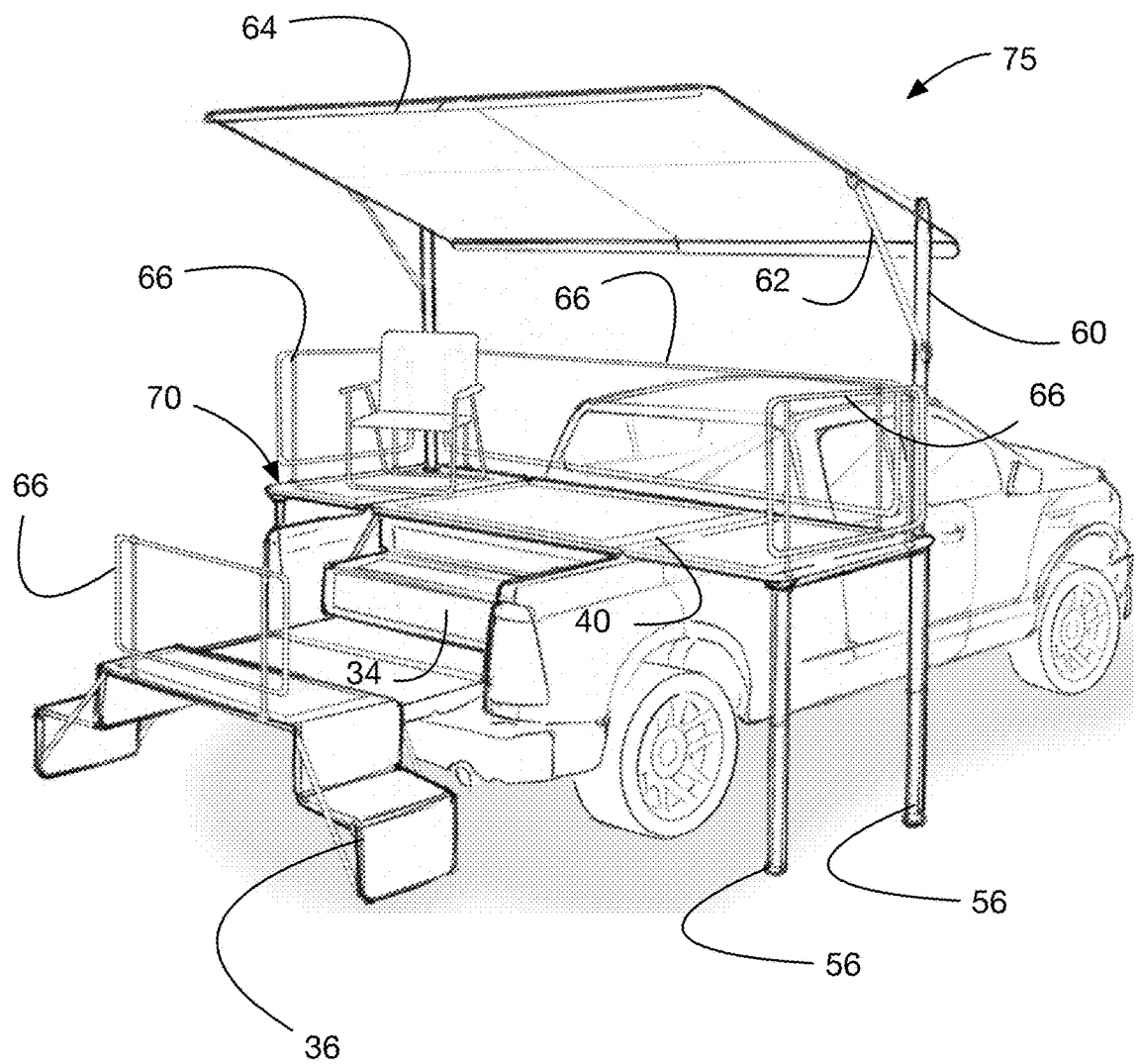
FIG. 11 is a perspective view of the invention being used with steps and guardrails where the platform size is larger and comprises of multiple sections fastened together.

FIG. 11 is an environmental view of the Elevated Platform Assembly 75 is similar to the view in FIG. 10 with a wider Platform Floor 70. The wider Platform Floor 70 comprises of a plurality of Platform Sections 40 that have been fastened together with plush mounted draw clamps.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An elevated platform assembly comprising:
   a platform floor with an approximately rectangular shape having a left edge, a right edge, a front edge, and a rear edge where each of the left edge, the right edge, the front edge and the rear edge,
   the length dimension of the left edge and length dimension of the right edge is approximately equal, and the length dimension of the front edge and the length dimension of the rear edge is approximately equal, and
   the left edge in communication with and be supported by a left side panel of a cargo vehicle, and the right edge in communication with and be supported by a right panel the cargo vehicle; further including a lip fixedly attached to the lower surface along the front edge of the platform floor, where the lip communicate into a preexisting cavity between a driver section and a cargo section of the cargo vehicle
   a lower surface wherein the lower surface includes
     a plurality of stakes along the left edge with each of the plurality of left edge stakes being fixedly attached to the lower surface and communicate into a plurality of preexisting pockets included on a top surface of the left side panels of the cargo vehicle,
     a plurality of stakes along the right edge with each of the plurality of right edge stakes being fixedly attached to the lower surface and communicate into a plurality of preexisting pockets included on a top surface of the right side panels of the cargo vehicle;
   an upper surface adapted to receive occupants thereupon.

2. An elevated platform assembly of claim 1 further comprising
   an awning having a left pole, a right pole, and a substantially rectangular shade component having an edge with a first end and a second end, with the left pole and the right pole hingeably connected respectively to the first end and the second end of the edge of the shade component, a left collar where the left collar is fixedly attached to a left collar location on the upper surface of the platform floor, a right collar where the right collar is fixedly attached to a right collar location on the upper surface of the platform floor, the left collar is adapted to receive the left pole, and the right collar is adapted to receive the right pole, and the left collar location and the right collar location are adapted to position the awning shade vertically above the upper surface of the platform floor upon inserting the left pole into the left collar and inserting the right pole into the right collar.

3. An elevated platform assembly of claim 1 further includes a handrail where the handrail is detachably attached to the upper surface along the left edge, the upper surface along the rear edge, and the upper surface along the right edge.

4. An elevated platform assembly of claim 1 having a platform floor with a width larger than the width of the vehicle's cargo area with the platform floor having an outside portion of the platform floor where the outside portion overhangs the vehicle's cargo area, and further having a plurality of telescopic legs with an adjustable height wherein the telescopic legs are in communication between the lower surface of the outside portion of the platform floor and a ground upon which the cargo vehicle is parked.

5. An elevated platform assembly of claim 1 further comprising a plurality of stepping devices having a step size lower than a height of the cargo vehicle floor.

6. An elevated platform assembly of claim 1 wherein the platform floor further comprising a left platform floor section where the left platform floor section is approximately rectangular in shape and has
a left edge, a right edge, a front edge, and a rear edge where each of the left edge, the right edge, the front edge and the rear edge has a length dimension, and
the length dimension of the left edge and length dimension of the right edge are approximately equal, and the length dimension of the front edge and the length dimension of the rear edge are approximately equal, and
the right edge includes a plurality of interlock teeth and a plurality of interlock receptors laid out along the length of the right edge in an alternating arrangement where each of the plurality of interlock teeth is followed by a interlock receptor and each of the plurality of interlock receptor is followed by an interlock tooth;
an upper surface and a lower surface wherein the lower surface includes
a plurality of stakes fixedly attached along the left edge with the plurality of stakes communicate into a plurality of preexisting pockets included within the side panels of a cargo vehicle, and
a plurality of platform support poles with each of the plurality of platform support poles having a length, a first end and a second end with the first end attached along the right edge with a hinge capable of being engaged in a fixed position, and the length of the platform support pole adapted to have the second end in contact with a floor of the cargo vehicle when the hinge is engaged in a fixed position;

a right platform floor section where the right platform floor section is approximately rectangular in shape and has
a left edge, a right edge, a front edge, and a rear edge where each of the left edge, the right edge, the front edge and the rear edge has a length dimension, and
the length dimension of the left edge and length dimension of the right edge are approximately equal, and the length dimension of the front edge and the length dimension of the rear edge are approximately equal, and
the left edge includes a plurality of interlock teeth and a plurality of interlock receptors laid out along the length of the right edge in an alternating arrangement where each of the plurality of interlock teeth is followed by a interlock receptor and each of the plurality of interlock receptor is followed by an interlock tooth;
an upper surface and a lower surface wherein the lower surface includes
a plurality of stakes fixedly attached along the right edge with the plurality of stakes communicate into a plurality of preexisting pockets included within the side panels of a cargo vehicle, and
a plurality of platform support poles with each of the plurality of platform support poles having a length, a first end and a second end with the first end attached along the left edge with a hinge capable of being engaged in a fixed position, and the length of the platform support pole adapted to have the second end in contact with a floor of the cargo vehicle when the hinge is engaged in a fixed position;
where the interlock receptors on the right edge of the left platform floor section are adapted to receive the interlock teeth on the left edge of the right platform floor section, and the interlock receptors on the left edge of the right platform floor section are adapted to receive the interlock teeth on the right edge of the left platform floor section, such that upon communicating the interlock teeth and receptors on the left platform section and the right platform section, a substantially uniform platform floor is formed with the upper surface of the left platform section aligned with the upper surface of the right platform section with no substantial discontinuity.

7. An elevated platform assembly of claim 6 further including a left lip fixedly attached to the lower surface along the front edge of the left platform floor section and, and a right lip fixedly attached to the lower surface of the front edge of the right platform floor section, where the left lip and the right lip are adapted to communicate into a preexisting cavity between a driver section and a cargo section of the cargo vehicle.

8. An elevated platform assembly of claim 6 further comprising
an awning having a left pole, a right pole, and a substantially rectangular shade component having an edge with a first end and a second end, with the left pole and the right pole hingeably connected respectively to the first end and the second end of the edge of the shade component,
a left collar where the left collar is fixedly attached to a left collar location on the upper surface of the left platform floor section, a right collar where the right collar is fixedly attached to a right collar location on the upper surface of the right platform floor section, the left collar is adapted to receive the left pole, and the right collar is adapted to receive the right pole, and the left collar location and the right collar location are adapted to position the awning shade vertically above the upper surface of the platform floor upon inserting the left pole into the left collar and inserting the right pole into the right collar.

9. An elevated platform of claim 6 further includes a handrail where the handrail is detachably attached to the upper surface along the left edge of the left platform section, the upper surface along the rear edge of both the left and the right platform floor sections, and the upper surface along the right edge of the right platform floor section.

10. An elevated platform assembly of claim 6 further having a platform floor with a width larger than the width of the vehicle's cargo area with the platform floor having an outside portion of the platform floor where the outside portion overhangs the vehicle's cargo area, and further having a plurality of telescopic legs with an adjustable height wherein the telescopic legs are in communication between the lower surface of the outside portion of the platform floor and a ground upon which the cargo vehicle is parked.

11. An elevated platform assembly of claim 6 further including a plurality of stepping devices having a step size lower than a height of the cargo vehicle floor.

12. An elevated platform assembly of claim 1 which further includes comprising an extender platform floor module having approximately rectangular shape with a having a left edge, a right edge, a front edge, and a rear edge where each of the left edge, the right edge, the front edge and the rear edge, and the length dimension of the left edge and length dimension of the right edge is approximately equal, and the length dimension of the front edge and the length dimension of the rear edge is approximately equal, a lower surface wherein the lower surface includes a plurality of stakes along the left edge with each of the plurality of left edge stakes being fixedly attached to the lower surface and adapted to communicate into a plurality of preexisting pockets included on a top surface of a left side panels of a cargo vehicle, a plurality of stakes along the right edge with each of the plurality of right edge stakes being fixedly attached to the lower surface and adapted to communicate into a plurality of preexisting pockets included on a top surface of a right side panels of the cargo vehicle, an upper surface adapted to receive occupants thereupon;

having the last stake on the platform floor occupy the same pocket as the first stake of the extender module.

13. An elevated platform of claim 12 further comprising an awning having a left pole, a right pole, and a substantially rectangular shade component having an edge with a first end and a second end, with the left pole and the right pole hingeably connected respectively to the first end and the second end of the edge of the shade component, a left collar where the left collar is fixedly attached to a left collar location on the upper surface of the platform floor, a right collar where the right collar is fixedly attached to a right collar location on the upper surface of the platform floor, the left collar is adapted to receive the left pole, and the right collar is adapted to receive the right pole, and the left collar location and the right collar location are adapted to position the awning shade vertically above the upper surface of the platform floor upon inserting the left pole into the left collar and inserting the right pole into the right collar.

14. An elevated platform of claim 12 further includes a handrail where the handrail is detachably attached to the upper surface along the left edge of the extender platform floor module, upper surface along the left edge of the platform floor, the upper surface along the rear edge of the platform floor, the upper surface along the right edge of the platform floor, and the upper surface along the right edge of the extender platform floor module.

15. An elevated platform of claim 12 including the platform floor and the extender platform floor module having a width larger than the width of the vehicle's cargo area with the platform floor having an outside portion of the platform floor and the outside portion of the extender platform floor module where the outside portion of the platform floor and the outside portion of the extender platform floor module overhangs the vehicle's cargo area, and further having a plurality of telescopic legs with an adjustable height wherein the telescopic legs are in communication between the lower surface of the outside portion of the platform floor module and the outside portion of the extender platform floor module and a ground upon which the cargo vehicle is parked.

16. An elevated platform of claim 12 further comprising a plurality of stepping devices having a step size lower than a height of the cargo vehicle floor.

* * * * *